United States Patent [19]
Santilli et al.

[11] 3,859,315
[45] Jan. 7, 1975

[54] DISUBSTITUTED ACETAMIDOANTHRAQUINONES

[75] Inventors: Arthur A. Santilli, Havertown; Anthony C. Scoiese, King of Prussia; Stanley C. Bell, Penn Valley, all of Pa.

[73] Assignee: American Home Products Corporation, New York, N.Y.

[22] Filed: Oct. 30, 1972

[21] Appl. No.: 302,308

[52] U.S. Cl. ............. 260/377, 260/246 B, 424/320
[51] Int. Cl. ............................................. C09b 1/40
[58] Field of Search ................................... 260/377

[56] References Cited
UNITED STATES PATENTS

| 989,602 | 4/1911 | Hence | 260/377 |
|---|---|---|---|
| 3,418,342 | 12/1968 | Buecheler | 260/377 |

Primary Examiner—Lorraine A. Weinberger
Assistant Examiner—Paul J. Killos
Attorney, Agent, or Firm—David E. Frankhouser

[57] ABSTRACT

Di(substituted)acetamidoanthraquinones have antiinflammatory activity.

4 Claims, No Drawings

DISUBSTITUTED ACETAMIDOANTHRAQUINONES

This invention relates to new and pharmacologically active di(substituted)acetamidoanthraquinones. The invention sought to be patented comprises chemical compounds selected from the group consisting of a. a disubstituted anthraquinone in which one substituent is a 2-(diethylamino)acetamido, 2-(dipropylamino)acetamido, or 2-(morpholino)acetamide group substituted in the 2-position and the other substituent is the same 2-(diethylamino)acetamido, 2-(dipropylamino)acetamido, or 2-(morpholino)acetamido group substituted in either the 6- or 7-position; and b. a disubstituted anthraquinone in which one substituent is a 2-(diethylamino)acetamido, 2-(dipropylamino)acetamido, or 2-(morpholino)acetamido group substituted in the 1-position and the other substituent is the same 2-(diethylamino)acetamido, 2-(dipropylamino)acetamido, or 2-(morpholino)acetamido group substituted in either the 5-, 6-, or 7-, 8-position; and the non-toxic, pharmacologically acceptable acid addition salts thereof.

Said compounds possess antiinflammatory activity as demonstrated by evaluation in standard pharmacological test procedures. In the testing of the compounds, adjuvant-induced arthritis is induced in rats by injection of dead mycobacteria into the hind footpad. The test compound is administered orally daily for 16 consecutive days beginning with the day of injection. The injected foot swells rapidly during the first 4 to 6 days. Thereafter, the swelling subsides until the 8th day, and then it resumes. About 4 to 10 days after injection, the other hind paw (un-injected) becomes swollen and other inflammatory nodules may be found in the ear and tail. The swelling of the injected paw at day 4 is taken as an indication of an acute inflammatory response. The swelling of the same paw at day 16 is taken as a delayed inflammatory response. The swelling of the other hind paw at day 16 is taken as a delayed hypersensitivity reaction. Active antiinflammatory compounds reduce the swelling in either the acute and/or the delayed phases. Steroidal and non-steroidal antiinflammatory agents reduce swelling in the acute and/or the delayed phase, while immunosuppressives reduce swelling only in the delayed phase. The per cent protection against swelling, as compared to non-treated controls, is calculated and is used as a measure of antiinflammatory activity. When tested in the above-described manner, the compounds reduced the swelling of adjuvant-induced arthritis in rats at a daily dose of 50–150 mg./kg. (body weight).

The compounds of the invention are prepared from the appropriate anthraquinorylenebis (2-chloroacetamide) starting material by reaction with either diethylamine, dipropylamine, or morpholine in an unreactive solvent, such as ethanol, at reflux temperature. The product is isolated by conventional procedures. The product can be obtained as the free base or it can be converted to the acid addition salt thereof by contacting the base in an inert solvent with a suitably strong non-toxic, pharmacologically acceptable acid. Suitable acids are hydrochloric, hydrobromic, sulfuric, methanesulfonic, p-toluenesulfonic, maleic, tartaric, or succinic acids.

The anthraquinylenebis(2-chloroacetamide) starting materials can be made from an appropriate diaminoanthraquinone, which are known compounds, by reaction with chloroacetyl chloride. The manner and processes for making and using the compounds of the invention are set forth in the following examples, wherein all temperatures are given in Centigrade degrees.

EXAMPLE I 2,6-Anthraquinonylenebis(2-Chloracetamide)

A stirred mixture of 30 g. of 2,6-diaminoanthraquinone is heated under reflux in 500 ml. of chloroacetyl chloride for 5 hours. The reaction mixture is filtered and the filter cake washed with benzene to afford a quantitative yield of the title compound.

EXAMPLE II

N,N'-(2,6-Anthraquinonylene)bis(2-Dipropylaminoacetamide), Dihydrochloride, Hydrate A stirred mixture of 10 g. of 2,6-anthraquinonylenebis(2-chloroacetamide) and 25 ml. of dipropylamine in 300 ml. of ethanol is heated under reflux for 5 hours. The reaction mixture is filtered and the filtrate cooled in ice. The precipitate is collected and recrystallized from ethanol to afford pure free base. This material is dissolved in ethanol and is acidified with alcoholic hydrochloric acid solution. The crystalline product which is deposited is collected to give 2.6 g. of the title compound, m.p. 298°–301° d. Analysis for $C_{30}H_{44}N_4O_5Cl_2$ Calculated: C, 58.91; H, 7.25; N, 9.16
Found: C, 58.77; H, 7.04; N, 9.34

EXAMPLE III

N,N'-(2,6-Anthraquinonylene)bis(2-Morpholinoacetamide)

A stirred mixture of 10 g. of 2,6-anthraquinonylenebis(2-chloroacetamide) and 25 ml. of morpholine in 300 ml. of ethanol is heated under reflux for 5 hours. The reaction mixture is filtered and the filter cake recrystallized from ethanol-N,N-dimethylacetamide to give 5.3 g. of the title compound, m.p. 269°–273°. Analysis for $C_{26}H_{28}N_4O_6$ Calculated: C, 63.40; H, 5.73; N, 11.38
Found: C, 63.24; H, 5.96; N, 11.39

EXAMPLE IV

N,N'-(2,6-Anthraquinonylene)bis[2-Diethylamino-Acetamide], Dihydrochloride, Hydrate A stirred mixture of 24 g. of 2,6-anthraquinonylenebis(2-chloroacetamide) and 50 ml. of diethylamine in 1500 ml. of ethanol is heated under reflux for 5 hours. The reaction mixture is filtered and the filtrate cooled in ice. The precipitate is collected and recrystallized from ethanol to afford pure free base, m.p. 195°–198°. This material is dissolved in 600 ml. of ethanol and the solution is acidified with alcoholic hydrochloric acid solution. The crystalline product which is deposited is collected to give 17.5 g. of the title compound, m.p. 306°-309° d. Analysis for $C_{26}H_{36}N_4Cl_2O_5$ Calculated: C, 56.22; H, 6.53; N, 10.09
Found: C, 56.54; H, 6.27; N, 9.90

EXAMPLE V 1,5-Anthraquinonylenebis(2-Chloroacetamide)

A stirred mixture of 3 g. of 1,5-diaminoanthraquinone is heated under reflux in 100 ml. of chloroacetyl chloride for 5 hours. The reaction mixture is filtered and the filter cake washed with benzene to afford a quantitative yield of the title compound.

EXAMPLE VI

N,N'-(1,5-Anthraquinonylene)bis[2-Diethylamino-Acetamide]

A stirred mixture of 1 g. of 1,5-anthraquinonylenebis(2-chloroacetamide) and 10 ml. of diethylamine in 40 ml. of pyridine is heated under reflux for 5 hours. The reaction mixture is then filtered, and the filtrate poured into 400 ml. of water. The resulting precipitate is filtered and recrystallized from ethanol to afford 0.2 g. of the title compound, m.p. 227°-230°. Analysis for $C_{26}H_{32}N_4O_4$ Calculated: C, 67.22; H, 6.94; N, 12.06
Found: C, 67.12; H, 6.94; N, 11.83

EXAMPLE VII

The in vivo antiinflammatory activity of the compounds is elicited and demonstrated by employing the following procedures:

Male rats are randomly dispersed into groups. One group is injected with a mineral oil suspension of heat-killed tubercle bacilli in the subplantar portion of the right hind paw (day 0). On the same day, a single dose of the test compound, in aqueous suspension containing Tween 80, is administered orally by means of a metal feeding tube. Groups of normal and positive arthritic rats are given vehicle only. Each rat is given a single dose daily for a total of 16 days. On day 4, the volume of the injected (right) foot is measured by means of a mercury plethysmograph. On day 16, the volumes of both the injected, right foot and the left hind foot are measured. The ability of the test compound to protect against acute and delayed swelling is measured by calculating the percent decrease in volume of the test animals as compared to controls. When tested by the above procedures, the following compounds gave results as follows:

| Compound A | N,N'-(2,6-anthraquinonylene)bis-(2-dipropylaminoacetamide)dihydrochloride, hydrate |
| Compound B | N,N'-(2,6-anthraquinonylene)bis-(2-morpholinoacetamide) |
| Compound C | N,N'-(2,6-anthraquinonylene)bis-[2-diethylaminoacetamide]dihydrochloride, hydrate |

Results

| Compound | Daily Dose P.O. (mg./kg.) | % Inhibition of Swelling | | |
|---|---|---|---|---|
| | | Day 4 Rt. Paw | Day 16 Rt. Paw | Lft. Paw |
| A | 50 | 0 | 34 | 64 |
| B | 75 | 13 | 26 | 28 |
| C | 75 | 10 | 39 | 83 |
| | 150 | 58 | 68 | 87 |

When the compounds of the invention are employed as antiinflammatory agents, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

What is claimed is:

1. A compound selected from the group consisting of:
   a. a disubstituted anthraquinone in which one substituent is the 2-(diethylamino)acetamido or 2-(dipropylamino)acetamido group substituted in the 2-postion and the other substituent is the same 2-(diethylamino)acetamido or 2-(dipropylamino)acetamido group substituted in either the 6- or 7-postion; and
   b. a disubstituted anthraquinone in which one substituent is the 2-(diethylamino)acetamido or 2-(dipropylamino)acetamido group substituted in in the 1-position and the other substituent is the same 2-(diethylamino)acetamido or 2-(dipropylamino)acetamido group substituted in either the 5-, 6-, 7-, 7-, or 8-position; and the nontoxic, pharmacologically acceptable acid addition salts thereof.

2. A compound as defined in claim 1 which is N,N'-(2,6-anthraquinonylene)bis(2-dipropylaminoacetamide), dihydrochloride, hydrate.

3. A compound as defined in claim 1 which is N,N'-(1,5-anthraquinonylene)bis[2-diethylaminoacetamide].

4. A compound as defined in claim 1 which is N,N'-(2,6-anthraquinonylene)bis[2-diethylaminoacetamide].

* * * * *